July 1, 1924.

1,499,887

F. C. SNYDER ET AL

SCREW DRIVING MACHINE

Filed Aug. 25, 1919    7 Sheets-Sheet 1

Fig. 1

INVENTORS
F. C. Snyder, J. C. Steen & G. F. McNulty
BY Freau, Merkel, Saywell and Bond
ATTYS

F. C. SNYDER ET AL

SCREW DRIVING MACHIN.

Filed Aug. 25, 1919

INVENTORS
F.C.Snyder, J.C.Steen & G.F.McNulty
BY Frease, Merkel, Saywell and Bond
ATTYS'

July 1, 1924.

F. C. SNYDER ET AL

1,499,887

SCREW DRIVING MACHINE

Filed Aug. 25, 1919

INVENTORS
F.C. Snyder, J.C. Steen & G.F. McNulty
BY Frease, Merkel, Saywell and Bond,
ATTYS.

Patented July 1, 1924.

1,499,887

UNITED STATES PATENT OFFICE.

FLOYD C. SNYDER, JAMES C. STEEN, AND GREGORY F. McNULTY, OF MASSILLON, OHIO, ASSIGNORS TO THE REYNOLDS MACHINE COMPANY, OF MASSILLON, OHIO, A CORPORATION OF OHIO.

SCREW-DRIVING MACHINE.

Application filed August 25, 1919. Serial No. 319,784.

*To all whom it may concern:*

Be it known that we, FLOYD C. SNYDER, JAMES C. STEEN, and GREGORY F. McNULTY, citizens of the United States, all residing at Massillon, in the county of Stark and State of Ohio, have invented certain new and useful Improvements in Screw-Driving Machines, of which the following is a specification.

The invention relates to a machine for driving screws in all positions and directions with greater speed and accuracy than can be done by manual means, and the object of the improvement is to provide a machine with a movable driving head or chuck connected with the operating mechanism and the screw feeding magazine by flexible tubes or the like, the screws being fed to the head or chuck by air pressure through one of the tubes, flexible driving means being provided in another tube and flexible controlling means for the feeding mechanism being contained in a third tube.

The embodiment of the invention illustrated in the accompanying drawings includes flexible driving means between the power mechanism and the screw driving head for permitting the head to be operated at any angle required by the work upon which machine is being used; means for feeding the screws, one at a time, from a magazine to the screw driving head; means for conveying the screws, thus fed, through a flexible tube from the feeding mechanism to the head, for allowing free movement of the head in any direction; and a flexible controlling wire between the feeding mechanism and the driving head for timely and automatically feeding the screws from the magazine to the head by the operation of the head.

In the drawings—

Fig. 17, a section on line 17—17, Fig. 12.

Similar numerals of reference indicate corresponding parts throughout the several figures of the drawings.

Referring to the drawings the machine is shown mounted upon a stand or support 1, which forms no part of the machine proper, and may be dispensed with when the machine is mounted on a portable carriage or upon any other suitable support, such as a table or shelf.

The machine proper is carried upon a base plate 2 and is provided with a motor 3 which furnishes power for the driving head, the screw feeding mechanism and the air compressor. The pinion 4 is mounted upon the shaft 5 of the motor and meshes with the pinion 6 upon the compressor 7 which may be of any usual and well known construction and is arranged to maintain a supply of compressed air in the tank 8, the pipe 9 connecting the compressor with said tank. Compressed air is discharged from the tank through the pipe 10 which communicates with the air valve controlling the supply of air to the flexible screw feeding tube as will be later described.

A gear 11 on the shaft 12 meshes with the pinion 4. The shaft 12 is journaled within a housing 13 carried by a U-shaped bracket 14 mounted upon the bed plate 2 and is provided with a worm 15 located within the housing and meshing with a worm wheel 16 mounted upon the extremity of the flexible shaft 17, said shaft being contained within a flexible tube 18 and operatively connected with the screw driving head as will be described.

The shaft 12 extends to a point adjacent to the vertical shaft 19 of the screw feeding magazine 20 and is provided with a worm 21 which meshes with the worm wheel 22 fixed upon the shaft 19.

Figure 1:
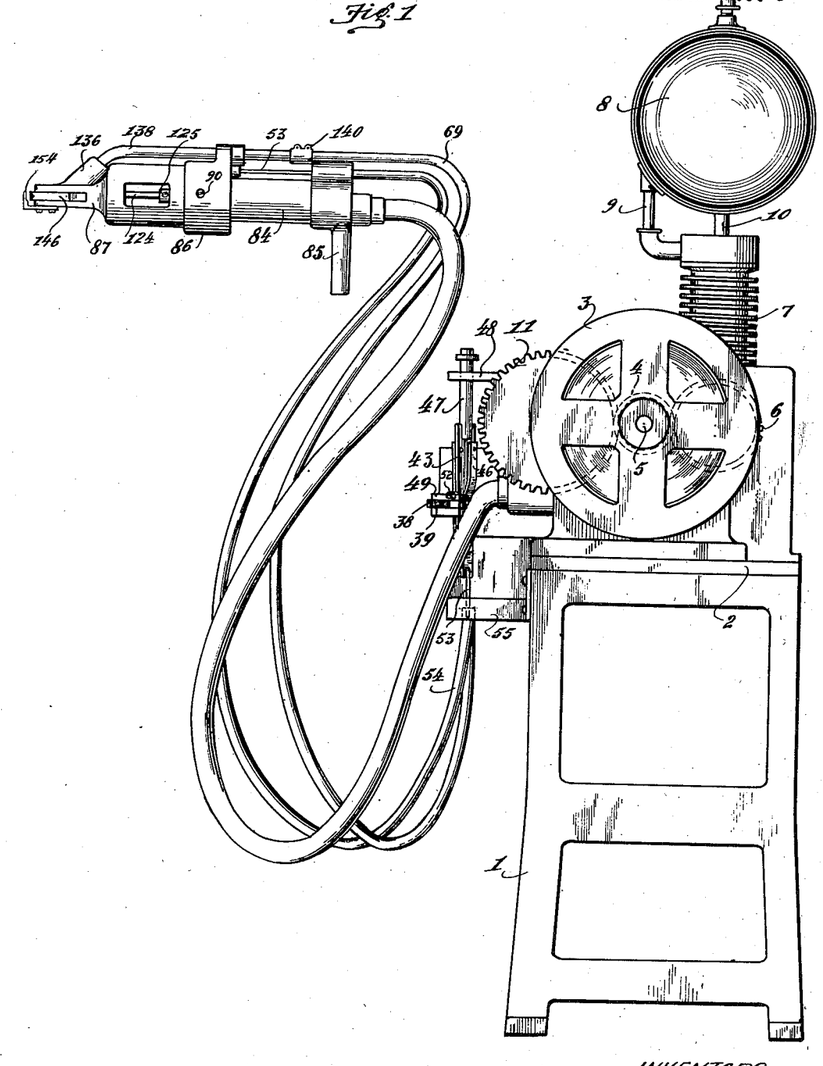
Figure 1 is a side elevation of the improved screw driving machine.
Figure 2:
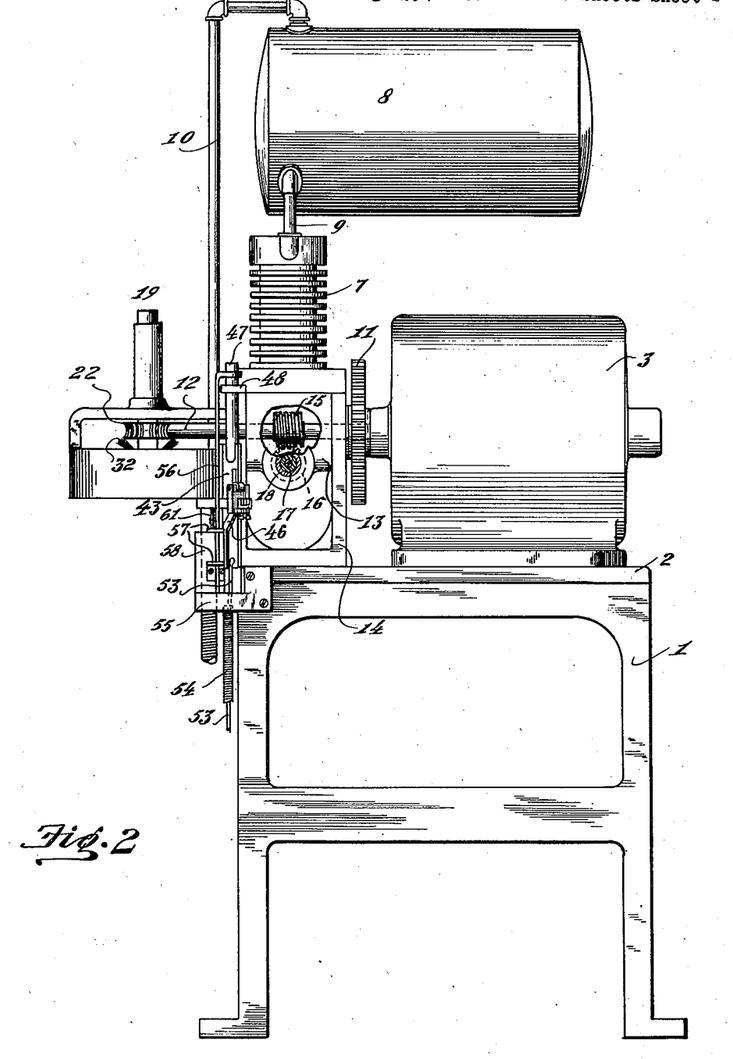
Fig. 2, a front elevation of the same without the driving head, the flexible tubes leading thereto being broken off.
Figure 3:
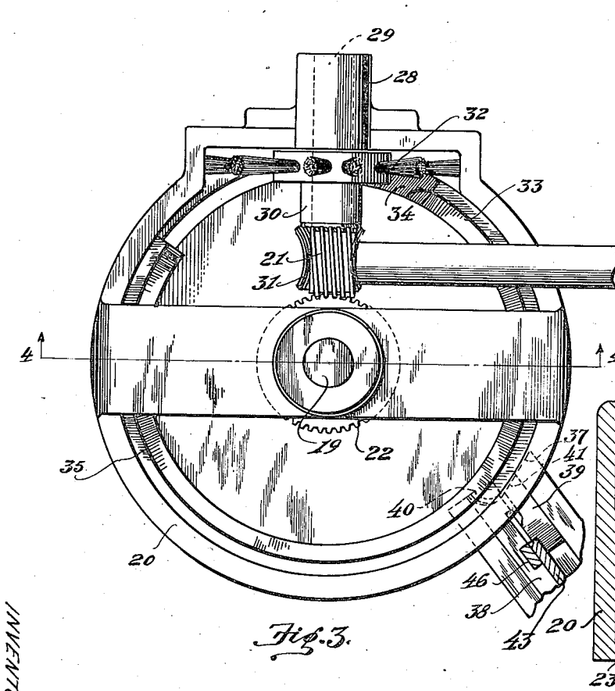
Fig. 3, a plan view of the screw feeding magazine.
Figure 4:
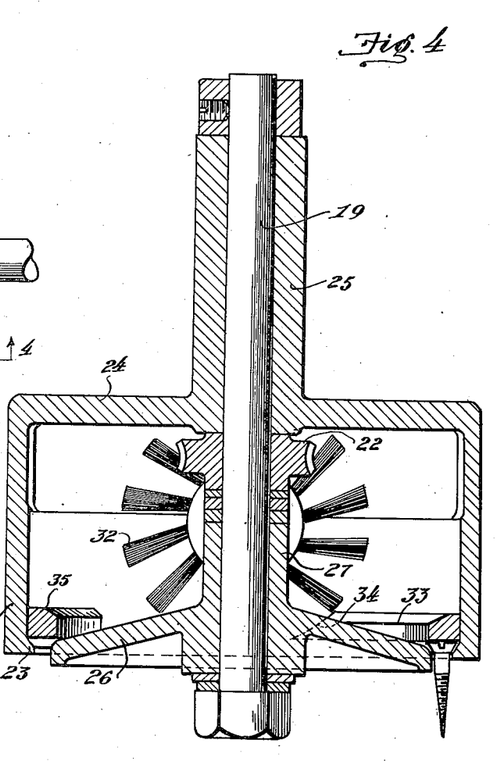
Fig. 4, a section on line 4—4, Fig. 3.
Figure 5:
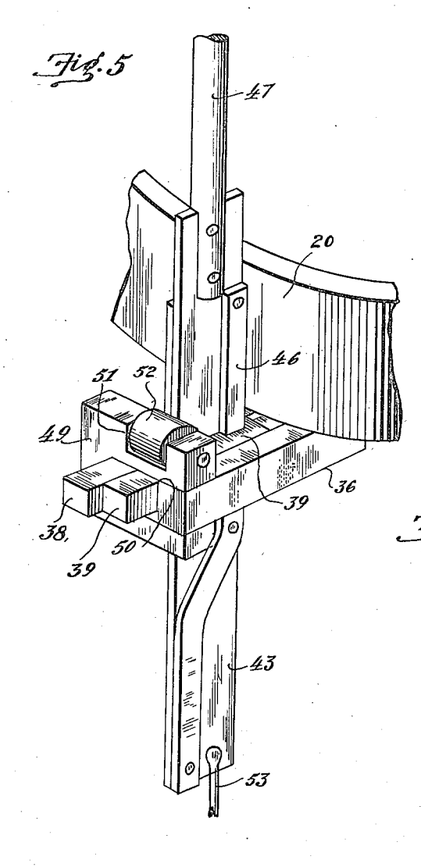
Fig. 5, a detail perspective view of the escapement mechanism, showing a fragmentary portion of the feed magazine.
Figure 6:
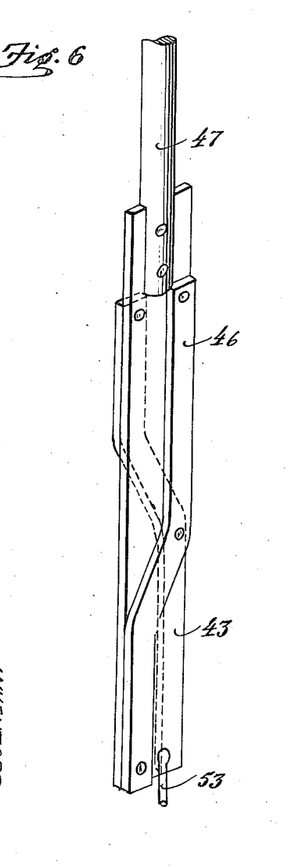
Fig. 6, a detail perspective view of the cam blade.

The magazine 20 is substantially circular in plan view and comprises an annular side wall having an in-turned beveled flange 23 at its lower edge and is provided with the arch 24 which supports the bearing 25 for the spindle 19. The conical dial 26 is provided with a hub 27 by means of which it is mounted upon the spindle 19, said dial being inclined downwardly towards its periphery which is located in the same horizontal plane with the beveled flange 23 and is spaced therefrom a distance corresponding to the diameter of the shank of the screws to be deposited therein, and the circumferential edge of the dial is likewise beveled upon its upper face corresponding with the bevel of the flange 23.

The periphery of the dial 26 is spaced sufficiently from the edge of the flange 23 to form a circular space or run-way into which the stems of the screws supplied to the magazine fall and are suspended by reason of the heads thereof resting on the beveled edge of the dial and the flange 23. Attached to the rear portion of the annular wall of the magazine is a bearing 28 within which is mounted the horizontal shaft 29, a sleeve 30 being located upon said shaft and provided with a worm wheel 31 actuated by the worm 21 which also drives the spindle 19.

A circular brush 32 is also mounted upon the sleeve 30, the diameter of this brush being such that it will brush back any surplus screws which may be carried forward by the dial and allow only those to pass which are suspended by their heads in the annular run-way. A guard ring 33 is connected to the inner surface of the magazine and extends from a point beneath the center of the brush, where it is tapered as shown at 34, to a point just beyond the escapement mechanism which will be later described.

The guard ring is spaced above the flange 23 and the periphery of the rotating dial 26 a sufficient distance to allow the heads of screws to pass freely beneath said ring when the screws are hanging vertically in the annular run-way but is sufficiently close to the annular run-way to prevent any screws passing beneath the ring, excepting those which are suspended therein in the proper position.

Connected to the inner face of the magazine and extending from the escapement mechanism to a point adjacent the brush 32 is a ring 35 which extends over the periphery of the dial 26 and is spaced from said dial and the flange 23, a sufficient distance to prevent screws from passing beneath said ring.

The escapement mechanism which permits of the discharge of the pendent screws one at a time into the flexible tube leading to the driving head comprises the escapement case 36 which is of channel shape in cross section and is connected at its inner extremity to the bottom of the magazine 20. This escapement case is preferably located at an angle to a radius of the magazine as best illustrated in Fig. 3 and its inner end is angularly recessed at 37 to receive the screws from the annular run-way.

An escapement finger 38 and a cut-off finger 39 are slidably mounted within the channel of the escapement case, the escapement finger being provided with the curved recess 40 upon its outer extremity to receive the screws one at a time as they enter the escapement case while the cut-off finger is provided with the beveled outer extremity 41 for the purpose of cutting off the admission of screws to the escapement case after one screw has been released by the escapement finger.

The escapement and cut-off fingers are recessed upon their adjacent faces as indicated at 42 to permit of longitudinal movement of the fingers upon each side of the cam blade 43, and vertically disposed grooves 44 and 45 are provided in the escapement finger and cut-off finger respectively to receive the escapement cams 46 one of which is provided upon each side of the cam blade 43.

The guide rod 47 is connected to the upper extremity of the cam blade and is vertically slidably mounted through a bearing 48 supported upon any suitable portion of the frame work such as the U-shaped bracket 14.

The roller yoke 49 is provided with a horizontal slot 50 which receives the outer end of the escapement case and is connected thereto by any suitable means. A recess 51 is provided in the upper portion of the roller yoke within which recess is journaled the bearing roller 52, the outer edge of the cam blade 43 bearing against said roller. To the lower end of the cam blade is connected a flexible wire 53, which extends through the flexible tube 54, the upper end of which tube is connected to the bracket 55, which bracket may be supported upon any suitable portion of the frame, such as the base plate 2, the other extremity thereof being connected to the driving head as will be later described.

The air valve controlling bar 56 is connected at its upper extremity to the guide rod 47 and extends downwardly parallel with the guide rod and cam blade, the lower extremity thereof being slidably mounted through brackets 57 carried upon the valve housing 58, said valve housing being mounted upon the bracket 55. A shoulder 59 is formed near the lower end of the bar 56, a notch 60 being formed in said bar above the shoulder.

The chute 61 extends downwardly from a point directly beneath the inner end of the escapement case in a position to receive the screws as they are released by the escapement mechanism. This chute communicates with a vertical bore 62 through the valve casing 58, a horizontally disposed passage 63, rectangular in cross section, being provided in the valve casing intermediate the extremities of the bore 62. A piston-valve 64, rectangular in cross section and provided with a beveled end 65, to which is connected a stem 66, slidably mounted in a horizontal bore 67 in the casing, being slidably mounted within said rectangular passage and having a vertical bore 68 arranged to normally communicate with the bore 64 to allow free passage of each screw from the ecsapement mechanism to the flexible tube 69 which is connected to the lower extremity of the bore 62, the other end of said flexible tube being connected to the screw driving head as will be further described.

The pipe 10 from the air tank 8 communicates with the horizontal passage 70 the inner extremity of the said passage terminating in the vertically disposed port 71 which communicates at its lower end with a second vertical exhaust port 72 spaced from and parallel therewith, said second named passage communicating at its lower end with the rectangular passage 63 while its upper end extends through the upper surface of the valve casing 58.

Figures 9, 10, 11:
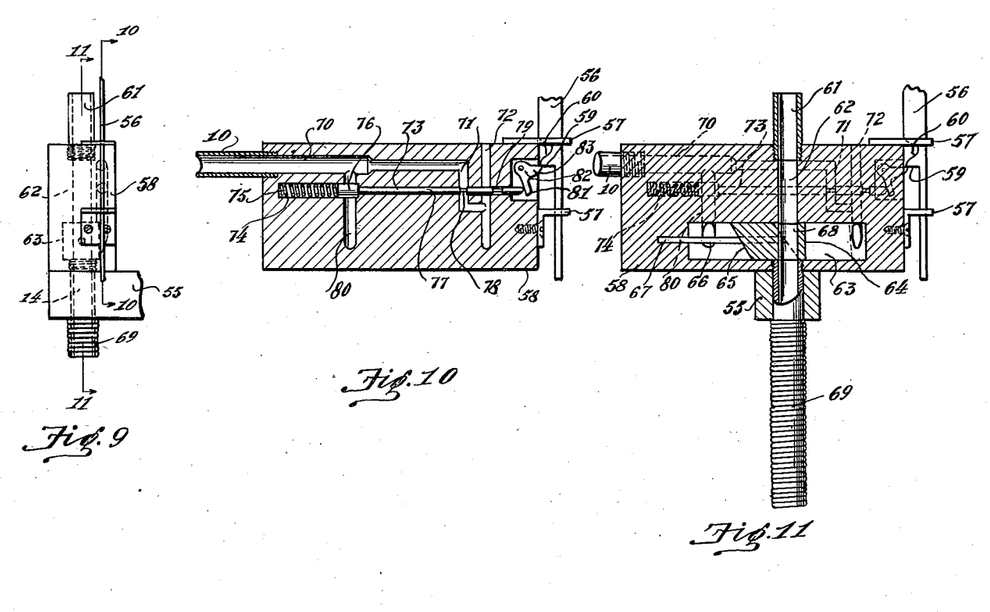
Fig. 9, a front elevation of the air valve casing.
Fig. 10, a sectional view of the air valve casing on line 10—10, Fig. 9.
Fig. 11, a similar section on line 11—11, Fig. 9.

Spaced beneath and parallel with the horizontal passage 70 is a guide bore 73 which intersects the vertical passages 71 and 72 and extends through the forward end of the valve casing 58, the rear portion of said bore being enlarged as at 74 and containing an expansion spring 75 which bears against the enlarged head 76 formed upon the valve rod 77 which rod is slidably mounted within the bore 73 and is provided with the ports 78 and 79, the port 78 being normally located at the intersection of the passages 71 and 73 allowing the air to enter the forward end of the rectangular passage 63 holding the piston-valve 64 in the position shown in Fig. 11.

A port 80 connects the horizontal passage 70 with the rear end of the rectangular passage 63 and intersects the enlarged portion 74 of the guide bore 73, the head 76 upon the valve rod normally closing the passage 80 as shown in Fig. 10.

The outer extremity of the valve rod 77 extends through the forward end of the valve casing and engages the arm 81 of the pivoted dog 82, the lug 83 upon said dog being normally held in the path of the shoulder 59 upon the rod 56 by means of the expansion spring 75.

The screw driving head comprises the rear casing 84, provided with the operating handle 85, the front casing 86 and the sliding chuck 87 which is slidably mounted within the forward end of the front casing. The rear casing 84 is provided with the enlarged forward portion 88 which receives the rear end of the front casing 86, the forward end of the rear casing abutting against the annular flange 89 upon the front casing, screws 90 or their eqivalents connecting the two casings together.

A cylindrical cap 91 extends over the rear portion of the rear casing and is connected thereto by means of screws 92 or the like, said cylindrical cap being provided with an end wall 93 having an outwardly disposed threaded nipple 94 through which the flexible driving shaft 17 is located. The flexible tube 18 which encloses the flexible driving shaft is provided with a flanged coupling member 95, a flanged internally screw threaded collar 96 being placed upon the threaded nipple 94 for the purpose of attaching the flexible tube 18.

The screw driving shaft 97 is journaled within the rear casing, a bushing 98 being provided around a portion of said shaft. The rear end of the shaft is screw threaded at 99, jam nuts 100 being located thereon for adjusting the shaft within the casing. The forward end of the shaft 97 is reduced as shown at 101 and the enlarged portion of the shaft is provided upon diametrically opposite sides with grooves 102 within which are slidably located bars 103, the forward ends of said bars engaging a collar 104 slidably mounted upon the reduced end of the shaft while the rear ends of the bars are engaged by the tangs 105 upon the washer 106, an adjusting nut 107 being threaded upon the shaft in rear of the washer for the purpose of longitudinally adjusting the bars 103. The end of the flexible driving shaft 17 is inserted into a bore 108 in the driving shaft 97 and is operatively connected thereto by means of the key 109.

A sleeve 110, is pinned at its rear end, to the rear portion of the screw driving shaft by means of a pin 111, the forward end of said sleeve being provided with an outwardly disposed flange 112, a friction disk 113 being mounted upon the rear face of said flange.

An expansion spring 114 is located around the reduced portion 101 of the drive shaft 110 and between the sliding collar 104 and a similar collar 115, said last named collar bearing against a disk 116 which is slidably mounted upon the reduced portion of the driving shaft and provided with a forwardly extending tubular portion 117. This disk is connected near its periphery by means of screws 118 or the like with the inturned annular flange 119 of a friction disk 120 which is normally held in frictional engagement with the friction disk 113 by means of the expansion spring 114, the pressure of the spring being varied by an adjustment of the bars 103.

The screw driving spindle 121 extends into the tubular portion 117 and is connected thereto by means of a pin 122 located through a suitable aperture in said spindle and through slots 123 in the tubular portion 117. The bit 124 has its rear portion located within the tubular portion 125 of the spindle and is connected thereto by means of a set screw 126.

A buffer plate 127 is located around the tubular portion 117 in rear of the front casing and is provided with studs 128 which project through suitable apertures 129 in the rear wall of the front casing. One or more sockets 130 are provided in the rear wall of the front casing, each socket receiving one end of an expansion spring 131 the other end being located in a similar socket 132 provided in the sliding chuck 87.

The end of the screw driver extends into a bore 133 in the sliding chuck, a bushing 134 being preferably provided in said bore. Adjusting screws 135 are located through suitable threaded apertures in the sliding head, the rear ends thereof being arranged to contact with the studs 128 upon the buffer plate as will be hereinafter described.

An angularly disposed tubular extension 136 is provided upon the sliding chuck and communicates with the bore 133, the bushing being cut out at 137 to allow screws to enter the bore from the tube 138 which is bent downwardly and extended into the tubular portion 136. The tube 138 extends backwardly above the casings and is slidably mounted through a bearing 139 formed in the rear casing, a coupling member 140 connecting said tube with the flexible tube 69.

A wire carrier 141 is mounted upon the rear portion of the tube 138 and fixedly connected thereto by means of a set screw 142, the forward end of the flexible wire 53 being attached to said carrier. The forward end of the flexible tube 54 within which the flexible wire 53 is encased is provided with a coupling member 143 which is attached to the boss 144 formed upon the rear casing 84.

The outer portion of the sliding chuck is grooved longitudinally upon diametrically opposite sides as shown at 145 to provide seats for the corresponding jaws 146. These jaws consist of elongated strips of metal which are fulcrumed at about their centers as shown at 147, each being provided near its rear extremity with sockets 148 which receive coil springs 149 keeping the lower ends of the jaws normally pressing in toward each other.

The outer ends of the jaws are turned inwardly toward each other as shown at 150 and are positioned beyond the outer extremity of the sliding chuck and their extremities approach near each other. Corresponding semi-funnel shaped grooves 151 are formed in the opposing faces of these extremities and when a screw is fed from the tube 138 into the bore 133, the point thereof enters this funnel shaped opening between the extremities of the jaws forcing the jaws apart as the screw is forced down between them by the bit 124. The jaws will hold the screw straight and steady while it is driven into the work by the bit.

The thrust piece 152, of angular form is connected to the under side of the forward end of the sliding chuck and provided with the up-turned portion 153 which is positioned in front of the extremities of the jaws and provided with a half round notch 154 through which the screw passes as it is driven into the work. This thrust piece is placed in contact with the work into which the screw is to be driven and prevents binding of the jaws by preventing their contacting with the work and also prevents marring of the work by holding the jaws out of contact therewith.

The operation of the device is as follows: Assuming that a screw has just been driven into the work and the sliding chuck is telescoped within the front casing of the screw driving head, the flexible wire 53 will hold the cam blade in the raised position, the escapement mechanism being thus in the position illustrated in Fig. 8, a screw being held suspended over the tube 61 by means of the escapement finger. At the same time the air valve mechanism is in the position shown in Figs. 10 and 11, the rod 56 however being in its raised position and out of engagement with the dog 82.

Figures 11, 12, 13:
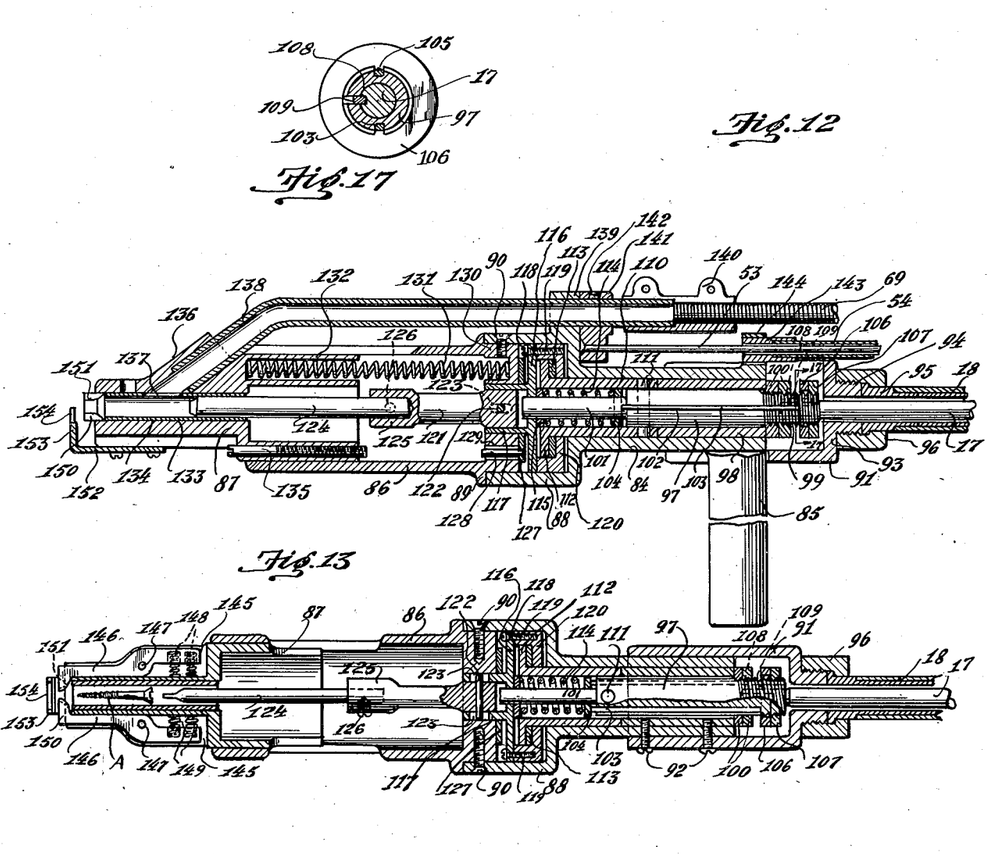
Fig. 12, a vertical longitudinal section of the screw driving head.
Fig. 13, a horizontal longitudinal section of the screw driving head.
Figures 14, 15, 16:
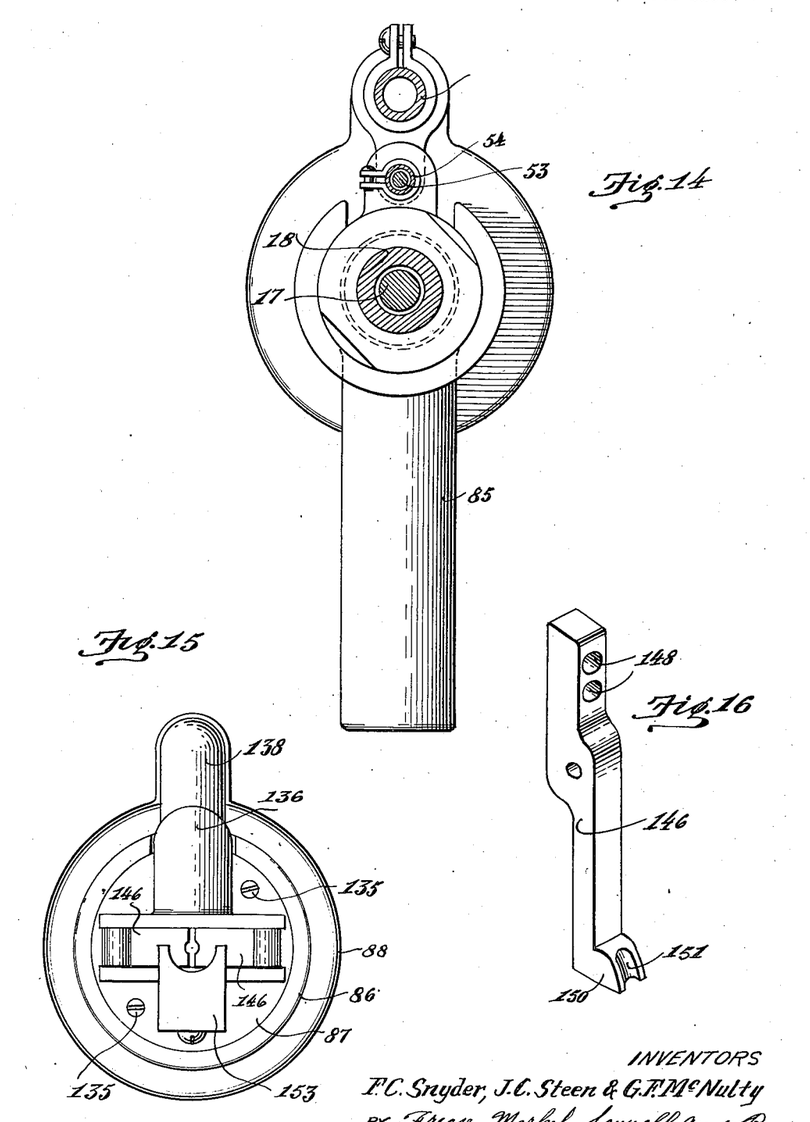
Fig. 14, a rear end view of the screw driving head, the flexible tubes being shown in section.
Fig. 15, a front end view of the screw driving head.
Fig. 16, a detail perspective view of one of the screw clamping jaws.

As the screw driving head is removed from the work the springs 132 will force the sliding chuck outwardly into the initial position shown in Figs. 12 and 13, drawing the flexible wire 53 forwardly through its flexible tube and pulling the cam blade downward. As the escapement finger is thus moved outward, the screw suspended above the tube 61 will be released as the inner end of the escapement finger clears the inner edge of the escapement case. At this instant the inner end of the cut-off finger will not have moved in sufficiently to engage the screw and it will be dropped into the tube 61 and through the bore 62 and the passage 68 in the piston 64, the screw passing downwardly into the flexible tube 69.

The bar 56 being carried downwardly by the guide rod will at this instant engage the dog 82, a further downward movement of the rod rocking the dog downwardly, pushing the valve rod 77 inwardly closing the port 78 and opening the exhaust port 72 and moving the head 76 out of the port 80 allowing the compressed air from the tube 10 to pass through the port 80 and into the inner end of the rectangular passage 63 forcing the piston-valve 64 outwardly into the position shown in dotted lines in Fig. 11, the compressed air passing down through the flexible tube 69 and impelling the screw through said tube and through the tube 138 into the bore of the sliding chuck as shown at A in Fig. 13.

As the bar 56 reaches the lower limit of its movement the portion 83 of the dog will ride up into the notch 60 in the bar 56, the spring 75 forcing the valve rod back into the position shown in Fig. 10 cutting off the admission of air to the rear end of the rectangular passage 63 and allowing the air to pass through the port 78 into the forward end of the passage 63 moving the piston-valve 64 back into the normal position shown by full lines in Fig. 11.

Figure 7:
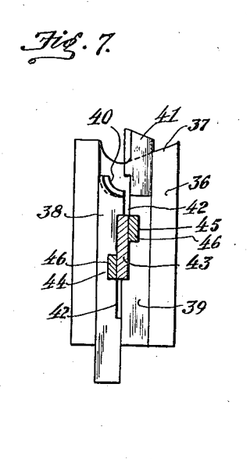
Fig. 7, a plan view of the escapement mechanism in the cutoff position.

The flexible shaft 17 is continuously rotated and through the friction disk 113 and flange 120 rotates the spindle 121 of the screw driving bit 124. As the cam blade descends to the lowest limit of its movement the escapement mechanism is moved into the position shown in Fig. 7, the cut-off finger 39 being moved inwardly preventing the admission of screws to the escapement mechanism, immediately after a screw has been released as above described.

When the screw has reached the position above mentioned in the sliding chuck the screw driving head may be then put into operation to drive the screw into the work. To accomplish this the thrust piece 153 is placed against the work at the point where it is desred to drive the screw and by means of the handle 85 the casing of the screw driving head is moved forward telescoping upon the sliding chuck, the bit 124 engaging the slotted head of the screw and forcing the screw between the inturned ends of the jaws 146 into the work.

When the casing has reached the forward limit of its movement with reference to the sliding chuck, which should be adjusted to occur at the instant the screw is driven entirely home into the work, the adjusting screws 135 will engage the studs 128 upon the buffer plate, pushing said buffer plate rearwardly into engagement with the disk 116 sliding said disk rearwardly, against the pressure of the spring 114 sufficiently to frictionally disengage the flange 120 from the friction disk 113 stopping further rotation of the bit.

Figure 8:
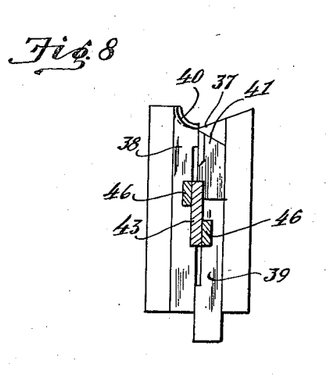
Fig. 8, a similar view of the escapement mechanism in position, just before releasing a screw.

During this operation of the driving head the flexible rod 53 will be moved rearwardly through its flexible tube, raising the cam blade to the upper limit of its movement, operating the escapement mechanism and moving the escapement and cut-off fingers into the position shown in Fig. 8, allowing a new screw to be moved into engagement with the curved inner extremity of the escapement finger as the cut-off finger is moved rearwardly. This screw remains suspended above the tube 69 until the driving head is removed from engagement with the work when the operation above described will be repeated and the screw will be fed into the sliding chuck. As the cam blade is moved into its upward position it will carry with it the rod 56 which controls the air valve mechanism thus leaving the air valve mechanism in proper position to receive the next screw as the driving head is removed from the work.

We claim:

1. A screw driving machine including a power mechanism and a magazine for containing screws, a screw driving head comprising a casing and a screw holding chuck reciprocally mounted within the casing, a flexible shaft operatively connecting the power mechanism and the driving head, a flexible tube connecting the magazine and the driving head, an escapement mechanism for feeding the screws one at a time through the flexible tube to the driving head, and a flexible wire operatively connecting the driving head and the escapement mechanism for actuating the escapement mechanism by the telescoping of the casing over the chuck.

2. A screw driving machine including a screw driving head comprising a casing, a revoluble bit located within the casing, and a screw holding chuck reciprocally mounted within the casing, the casing being arranged to be telescoped over the chuck for extending the bit through the chuck when the head is operated, means for rotating the revoluble bit, a magazine and flexible tube connecting the magazine and the driving mechanism, an escapement mechanism for feeding screws from the magazine one at a time, to the flexible tube, a valve controlling the admission of fluid pressure to the flexible tube, a sliding rod, means upon the rod for operating the escapement mechanism and the fluid valve, and means connecting the sliding rod to the head for operating the rod when the casing is telescoped over the chuck.

3. A screw driving machine including a screw driving head comprising a casing, a revoluble bit located within the casing and a screw holding chuck reciprocally mounted within the casing, the casing being arranged to be telescoped over the chuck for extending the bit through the chuck when the head is operated, means for rotating the revoluble bit, a magazine and flexible tube connecting the magazine and the driving mechanism, an escapement mechanism for feeding screws from the magazine one at a time, to the flexible tube, a valve controlling the admission of fluid pressure to the flexible tube, a sliding rod, means upon the rod for operating the escapement mechanism and the fluid valve, and a wire connecting the sliding rod to the chuck for operating the rod when the casing is telescoped over the chuck.

FLOYD C. SNYDER.
JAMES C. STEEN.
GREGORY F. McNULTY.